United States Patent
Park et al.

(10) Patent No.: US 12,241,675 B2
(45) Date of Patent: Mar. 4, 2025

(54) INJECTION RESIN COMPOSITION FOR HOME APPLIANCE AND REFRIGERATOR USING THE SAME

(71) Applicant: SAMSUNG ELECTRONICS CO., LTD., Suwon-si (KR)

(72) Inventors: Nohcheol Park, Suwon-si (KR); Miran Kim, Suwon-si (KR); Youngdeog Koh, Suwon-si (KR); Kwangjoo Kim, Suwon-si (KR); Jongun Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 62 days.

(21) Appl. No.: 17/956,292

(22) Filed: Sep. 29, 2022

(65) Prior Publication Data
US 2023/0204280 A1 Jun. 29, 2023

Related U.S. Application Data

(63) Continuation of application No. PCT/KR2022/013590, filed on Sep. 13, 2022.

(30) Foreign Application Priority Data

| Dec. 27, 2021 | (KR) | 10-2021-0189001 |
| Dec. 27, 2021 | (KR) | 10-2021-0189002 |
| Apr. 22, 2022 | (KR) | 10-2022-0050416 |

(51) Int. Cl.
*F25D 23/08* (2006.01)
*B32B 15/18* (2006.01)
(Continued)

(52) U.S. Cl.
CPC .......... *F25D 23/08* (2013.01); *B32B 27/302* (2013.01); *C08F 112/08* (2013.01); *C08L 25/12* (2013.01);
(Continued)

(58) Field of Classification Search
CPC ..... F25D 23/08; F25D 23/066; B32B 27/302; B32B 2264/20; B32B 2264/303;
(Continued)

(56) References Cited

U.S. PATENT DOCUMENTS

| 4,493,922 A | * | 1/1985 | Echte | C08L 51/04 |
| | | | | 525/71 |
| 5,834,126 A | * | 11/1998 | Sheu | F25D 23/066 |
| | | | | 428/518 |

(Continued)

FOREIGN PATENT DOCUMENTS

| EP | 2 230 260 A1 | 9/2010 |
| EP | 3 626 778 A1 | 3/2020 |

(Continued)

OTHER PUBLICATIONS

International Search Report dated Jan. 17, 2023 in International Patent Application No. PCT/KR2022/013590 (5 pages; 4 pages English translation).
(Continued)

*Primary Examiner* — Daniel J Rohrhoff
(74) *Attorney, Agent, or Firm* — STAAS & HALSEY LLP

(57) ABSTRACT

An injection resin composition for a home appliance having high flowability, high tensile strength, and excellent chemical resistance and a refrigerator using the same. A refrigerator according to an embodiment of the present disclosure includes: a cabinet frame defining an external appearance of the refrigerator; a liner separating an inside of the refrigerator from an insulation material while the insulation material is provided between the cabinet frame and the liner, wherein the liner includes a high impact polystyrene (HIPS) injection material or an acrylonitrile butadiene styrene (ABS) ALLOY injection material.

12 Claims, 5 Drawing Sheets

(51) Int. Cl.
*B32B 27/30* (2006.01)
*C08F 112/08* (2006.01)
*C08L 25/12* (2006.01)

(52) U.S. Cl.
CPC ....... *B32B 15/18* (2013.01); *B32B 2264/0207* (2013.01); *B32B 2264/20* (2020.08); *B32B 2264/303* (2020.08); *B32B 2270/00* (2013.01); *B32B 2307/304* (2013.01); *B32B 2307/54* (2013.01); *B32B 2307/546* (2013.01); *B32B 2307/558* (2013.01); *B32B 2307/714* (2013.01); *B32B 2307/732* (2013.01); *B32B 2509/10* (2013.01)

(58) Field of Classification Search
CPC ............... B32B 15/18; B32B 2270/00; B32B 2307/304; B32B 2307/54; B32B 2307/732; B32B 2509/10; C08F 1112/08; C08L 25/12
See application file for complete search history.

(56) References Cited

U.S. PATENT DOCUMENTS

| | | | |
|---|---|---|---|
| 6,164,739 A * | 12/2000 | Schulz | B32B 27/40 428/319.3 |
| 6,545,090 B1 * | 4/2003 | Demirors | C08F 279/02 525/70 |
| 9,506,686 B2 * | 11/2016 | Ko | F25D 23/064 |
| 10,479,885 B2 | 11/2019 | Eim et al. | |
| 11,021,602 B2 | 6/2021 | Michaelis De Vasconcellos et al. | |
| 2010/0197863 A1 * | 8/2010 | Bouquet | C08L 25/06 525/240 |
| 2018/0016432 A1 * | 1/2018 | Peng | F25D 23/066 |
| 2018/0086906 A1 * | 3/2018 | Eim | C08L 25/12 |
| 2018/0313600 A1 * | 11/2018 | De Luca | F25D 23/066 |
| 2019/0119487 A1 * | 4/2019 | Michaelis De Vasconcellos | C08L 23/0869 |
| 2019/0162465 A1 * | 5/2019 | Allard | F25D 23/028 |
| 2019/0390893 A1 * | 12/2019 | Csapos | B32B 27/32 |
| 2020/0123348 A1 * | 4/2020 | Kuo | C08F 212/10 |
| 2020/0182532 A1 * | 6/2020 | Cecchini | B29C 51/002 |
| 2022/0024192 A1 * | 1/2022 | Khizar | B32B 27/34 |

FOREIGN PATENT DOCUMENTS

| | | |
|---|---|---|
| JP | 8-136117 | 5/1996 |
| KR | 10-0245948 B1 | 3/2000 |
| KR | 10-2002-0063256 | 8/2002 |
| KR | 10-0580772 | 5/2006 |
| KR | 10-2009-0073453 | 7/2009 |
| KR | 10-2010-0033540 | 3/2010 |
| KR | 10-2010-0033540 A | 3/2010 |
| KR | 10-2013-0071576 A | 7/2013 |
| KR | 10-1288783 B1 | 7/2013 |
| KR | 10-2015-0120178 | 10/2015 |
| KR | 10-2015-0134823 | 12/2015 |
| KR | 10-2018-0035337 | 4/2018 |
| KR | 10-2018-0066624 A | 6/2018 |
| KR | 10-2018-0136990 | 12/2018 |
| KR | 10-2018-0136990 A | 12/2018 |

OTHER PUBLICATIONS

PCT/ISA/237 dated Jan. 17, 2023 in International Patent Application No. PCT/KR2022/013590 (5 pages).
European Search Report issued in counterpart European Application No. 22916290.4 dated Nov. 18, 2024.

* cited by examiner

CRACK

INJECTION RESIN COMPOSITION FOR HOME APPLIANCE AND REFRIGERATOR USING THE SAME

CROSS-REFERENCE TO RELATED APPLICATIONS

This application is a continuation application, under 35 U.S.C. § 111(a), of International Patent Application No. PCT/KR2022/013590 filed on Sep. 13, 2022, which claims the benefit of Korean Patent Application No. 10-2021-0189001, filed Dec. 27, 2021, Korean Patent Application No. 10-2021-0189002, filed Dec. 27, 2021 and Korean Patent Application No. 10-2022-0050416, filed Apr. 22, 2022, in the Korean Intellectual Property Office, the entire disclosures of each of which are incorporated herein by reference as a part of this application.

BACKGROUND

Field

The present disclosure relates to an injection resin composition for a home appliance and a refrigerator using the same, and more particularly, to an injection resin composition having chemical resistance and high flowability by using a high impact polystyrene (HIPS) or an acrylonitrile butadiene styrene (ABS) Alloy injection resin composition and a refrigerator using the same.

Description of Related Art

A refrigerator liner is a component to separate the inside of a refrigerator from foamed urethane used for adiabatic effects.

Conventional refrigerator liners have been manufactured by extruded sheet-preparing, vacuum forming, assembling, and urethane foaming processes. However, according to these conventional processes, there are problems of excessively increasing costs for equipment for the extrusion and vacuum formation and costs for performing the processes. In addition, in the case of products manufactured by vacuum forming, there are problems of difficulties in processing edges and corners and deterioration in external appearance quality because thin regions swells during the foaming process due to internal gas pressure.

To solve these problems, research on methods for manufacturing refrigerator liners by injection molding, assembling, and urethane foaming processes has been increased. Meanwhile, as refrigerators become larger, high flowability is required for injection molding of thin films and sufficient chemical resistance and tensile strength are required to improve the quality.

However, conventional resin compositions for injection molding processes cause occurrence of cracks in temperature cycle evaluation at a temperature of −30 to 70° C. due to inferior chemical resistance or deteriorate surface quality by vegetable oil contamination. Also, it is difficult to apply conventional resin compositions to injection molding due to low flowability.

SUMMARY

In accordance with an aspect of the present disclosure, a refrigerator includes: a cabinet frame defining an external appearance of the refrigerator; a liner separating an inside of the refrigerator from an insulation material while the insulation material is provided between the cabinet frame and the liner, wherein the liner includes a high impact polystyrene (HIPS) injection material or an acrylonitrile butadiene styrene (ABS) ALLOY injection material.

In addition, in the refrigerator according to an embodiment of the present disclosure, the liner may include a top side, a right side, left side, back side, and a bottom side, wherein the top side and right side and left side and back side of the liner include the HIPS injection material, and the bottom side of the liner includes the ABS ALLOY injection material.

In addition, in the refrigerator according to an embodiment of the present disclosure, the liner may have a thickness of 1 to 2.5 mm.

In addition, in the refrigerator according to an embodiment of the present disclosure, the HIPS injection material may include 45 to 65 parts by weight of a chemical-resistant HIPS material and 35 to 55 parts by weight of a highly flowable HIPS material based on 100 parts by weight of the HIPS injection material.

In addition, in the refrigerator according to an embodiment of the present disclosure, the chemical-resistant HIPS material may include 9.5 to 12 wt % of rubber, the balance being polystyrene (PS), and an average particle diameter of the rubber may be from 6.0 to 8.5 μm.

In addition, in the refrigerator according to an embodiment of the present disclosure, the highly flowable HIPS material may include 7.0 to 9.0 wt % of rubber, the balance being polystyrene (PS), and an average particle diameter of the rubber may be from 1.2 to 1.8 μm.

In addition, in the refrigerator according to an embodiment of the present disclosure, the HIPS injection material may have a melt index (MI) of 6.0 to 9.5 g/10 min.

In addition, in the refrigerator according to an embodiment of the present disclosure, the ABS ALLOY injection material may include 65 to 85 parts by weight of a styrene-acrylonitrile (SAN) resin, 10 to 20 parts by weight of an acrylonitrile-polybutyl acrylic acid-styrene copolymer resin (g-AAS), 5 to 15 parts by weight of an acrylonitrile-butadiene-styrene copolymer resin (g-ABS), and 3 to 6 parts by weight of ethylene/alkyl(meth)acrylate based on 100 parts by weight of the ABS ALLOY injection material.

In addition, in the refrigerator according to an embodiment of the present disclosure, the SAN resin may include 25 to 29 wt % of acrylonitrile and the balance of polystyrene (PS) and have a weight average molecular weight of 120,000 to 160,000.

In addition, in the refrigerator according to an embodiment of the present disclosure, the g-AAS and g-ABS may include 50 to 60 wt % of a rubber material, the balance being the SAN resin and having a core-shell structure.

In addition, in the refrigerator according to an embodiment of the present disclosure, the ethylene/alkyl(meth)acrylate may be represented by Formula 1 below:

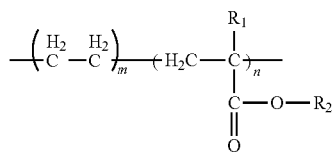

Formula 1

In the Formula 1 above, R1 is hydrogen or a methyl group, in Formula 1 above, R2, as a C1-C12 alkyl group, is hydrogen, a methyl group, an ethyl group, a propyl group, an isopropyl group, a butyl group, a sec-butyl group, a t-butyl group, or an isobutyl group, and in Formula 1 above, m and n are degrees of polymerization and a ratio of m to n is from 300:1 to 10:90.

In addition, in the refrigerator according to an embodiment of the present disclosure, the ABS ALLOY injection material may have a melt index (MI) of 4.5 to 8.0 g/10 min.

In accordance with another aspect of the present disclosure, a high impact polystyrene (HIPS) injection material for a home appliance, as a HIPS injection material composition, includes a chemical-resistant HIPS material and a highly flowable HIPS material, wherein the HIPS injection material includes 45 to 65 parts by weight of the chemical-resistant HIPS material and 35 to 55 parts by weight of the highly flowable HIPS material based on 100 parts by weight of the HIPS injection material, and the HIPS injection material may have a melt index (MI) of 6.0 to 9.5 g/10 min.

In addition, the HIPS injection material for a home appliance according to an embodiment of the present disclosure may have a tensile strength of 180 to 300 $kgf/cm^2$ and an impact strength of 7 to 16 kgf cm/cm.

In addition, the HIPS injection material for a home appliance according to an embodiment of the present disclosure may have a flexural modulus of 16000 to 24000 $kgf/cm^2$.

In addition, the HIPS injection material for a home appliance according to an embodiment of the present disclosure may have a heat deflection temperature (HDT) of 72 to 85° C. at a load of 1.82 kg.

In addition, the ABS ALLOY injection material for a home appliance according to an embodiment of the present disclosure, as an ABS ALLOY injection material composition, including a styrene-acrylonitrile (SAN) resin, an acrylonitrile-polybutyl acrylic acid-styrene copolymer resin (g-AAS), an acrylonitrile-butadiene-styrene copolymer resin (g-ABS), and ethylene/alkyl(meth)acrylate, may include 65 to 85 parts by weight of the SAN resin, 10 to 20 parts by weight of g-AAS, 5 to 15 parts by weight of g-ABS, and 3 to 6 parts by weight of ethylene/alkyl(meth)acrylate based on 100 parts by weight of the ABS ALLOY injection material, and may have a tensile strength of 400 to 520 $kgf/cm^2$ and an impact strength of 18 to 30 kgf cm/cm.

In addition, the ABS ALLOY injection material for a home appliance according to an embodiment of the present disclosure may have a flexural modulus of 18000 to 26000 $kgf/cm^2$.

In addition, the ABS ALLOY injection material for a home appliance according to an embodiment of the present disclosure may have a heat deflection temperature (HDT) of 72 to 90° C. at a load of 1.82 kg.

In addition, the ABS ALLOY injection material for a home appliance according to an embodiment of the present disclosure may have a melt index (MI) of 4.5 to 8.0 g/10 min.

DETAILED DESCRIPTION

Figure 1:
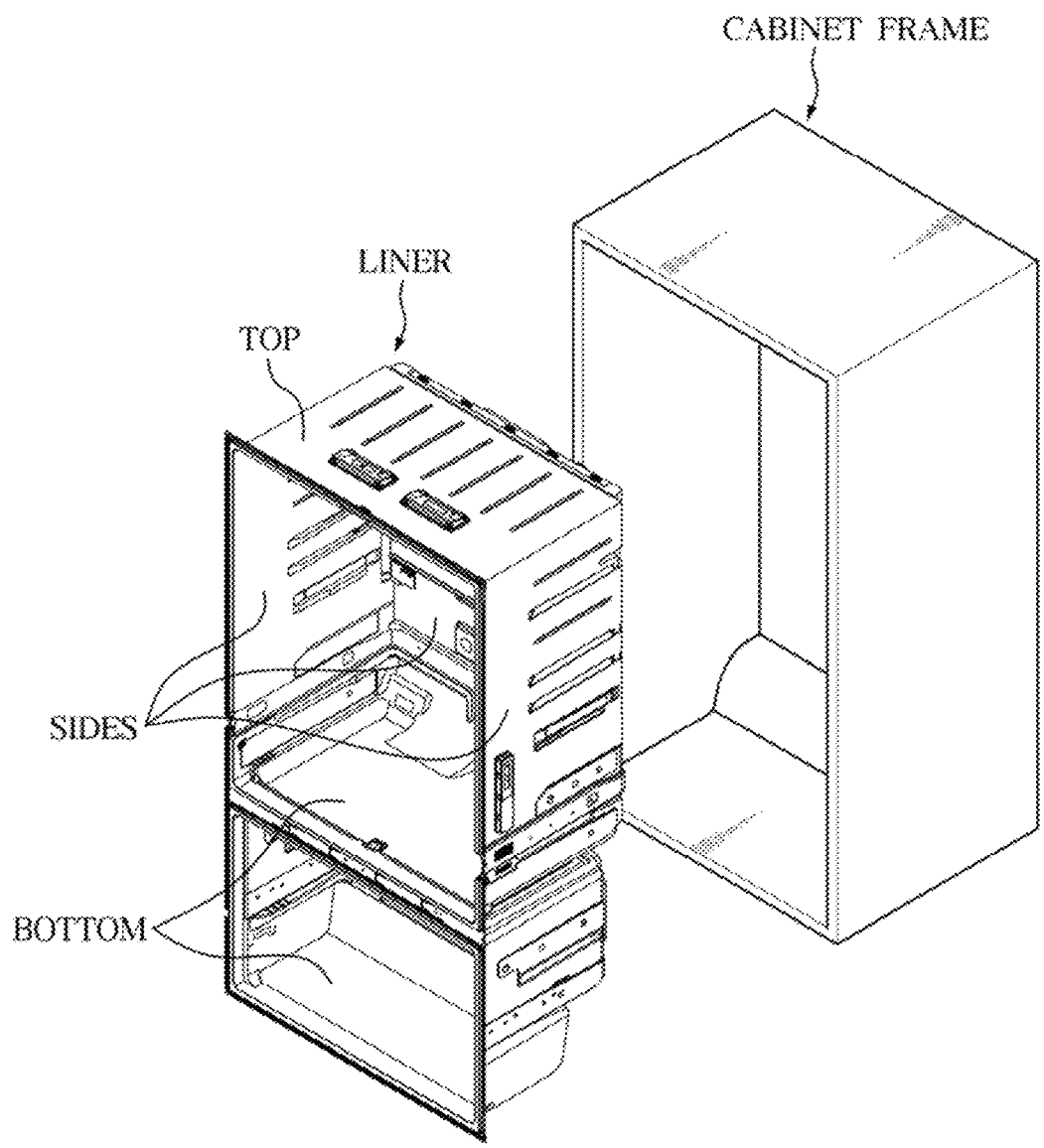
FIG. 1 is a schematic diagram of a refrigerator according to an embodiment of the present disclosure.

Hereinafter, embodiments of the present disclosure will be described in detail with reference to the accompanying drawings. These embodiments are provided to fully convey the concept of the present disclosure to those of ordinary skill in the art. The present disclosure may, however, be embodied in many different forms and should not be construed as limited to the exemplary embodiments set forth herein. In the drawings, parts unrelated to the descriptions are omitted for clear description of the disclosure and sizes of elements may be exaggerated for clarity.

Throughout the specification, the term "comprising" or "including" an element specifies the presence of the stated element, but does not preclude the presence or addition of one or more elements, unless otherwise stated.

An expression used in the singular encompasses the expression of the plural, unless otherwise indicated.

The present disclosure has been proposed to solve various problems, and provided is an injection resin composition for a home appliance having high flowability, high tensile strength, and excellent chemical resistance, and a refrigerator using the same.

According to an embodiment of the present disclosure, an injection resin composition for a home appliance having high flowability, high tensile strength, and excellent chemical resistance and a refrigerator using the same may be provided.

Also, according to an embodiment of the present disclosure, an injection resin composition for a home appliance with ease of edge and corner processing and improved appearance quality may be provided at low cost.

However, the effects achieved by the injection resin composition for a home appliance and the refrigerator using the same according to embodiments of the present disclosure are not limited to those given above, and any other effects not mentioned herein will be understood by those of ordinary skill in the art to which the present disclosure belong.

A refrigerator according to an embodiment of the present disclosure includes a cabinet frame defining an external appearance of the refrigerator; a liner separating the inside of the refrigerator from an insulation material; and the insulation material provided between the cabinet frame and the liner, wherein the liner includes a high impact polystyrene (HIPS) injection material or an acrylonitrile butadiene styrene (ABS) ALLOY injection material.

The liner is formed of a top, sides, and a bottom (top side, left and right and back sides, and bottom sides), wherein the top and sides of the liner may include a HIPS injection material, and the bottom of the liner may include an ABS ALLOY injection material.

FIG. 1 is a schematic diagram of a refrigerator according to an embodiment of the present disclosure.

Referring to FIG. 1, the refrigerator according to an embodiment of the present disclosure may include a cabinet frame provided at the outermost area of the refrigerator and defining an external appearance of the refrigerator, a liner separating the inside of the refrigerator from an insulation material, and the insulation material provided between the cabinet frame and the liner.

The liner may include a high impact polystyrene (HIPS) injection material or an acrylonitrile butadiene styrene (ABS) ALLOY injection material which are prepared by an injection molding process.

According to an embodiment, the injection material prepared by the injection molding process may constitute a liner having 5 surfaces by assembling 5 pieces of thin films of the injection material. In this regard, the 5 surfaces refer to an uppermost surface constituting the top, left, right, and rear surfaces constituting the sides, and a lower surface constituting the bottom.

The top and sides of the liner may include a HIPS injection material, and the bottom of the liner may include an ABS ALLOY injection material.

The ABS ALLOY injection material has excellent physical properties such as tensile strength, impact strength, and flexural modulus. Therefore, the ABS ALLOY injection material may be used to form the bottom of the liner which is in direct contact with objects contained in the refrigerator such as foods. Meanwhile, due to low manufacturing costs, the HIPS injection material may be used to form the top and sides of the liner to obtain price competitiveness. However, the embodiment is not limited thereto, the top, sides, and bottom of the liner may be formed of at least one of the ABS ALLOY injection material and the HIPS injection material, according to circumstances.

Also, in general, because the cabinet frame of the refrigerator is manufactured using a steel sheet, and the liner of the refrigerator is manufactured using a resin composition, a stress may be applied to the liner due to a difference in volume change rates therebetween caused by external factors such as temperature change. Therefore, the ABS ALLOY injection material having excellent physical properties may be used in the case where a high stress is applied and the HIPS injection material having excellent price competitiveness may be used in the case where a low stress is applied.

For example, because a high stress may be applied to a liner of a refrigerator with a large volume, the ABS ALLOY injection material may be used. Because a low stress may be applied to a liner of a refrigerator with a small volume, the HIPS injection material may be used.

Vegetable oil, which has a solubility constant similar to that of the resin composition, may easily penetrate into the resin composition and cause cracks. Particularly, the liner of the refrigerator constitutes the inside of the refrigerator, and vegetable oil is often stored therein for a long time. Therefore, sufficient chemical resistance is required. Meanwhile, examples of the vegetable oil include soybean oil, sesame oil, olive oil, and canola oil, without being limited thereto.

Furthermore, the ABS ALLOY injection material and the HIPS injection material may also be applied to home appliances that require sufficient strength and chemical resistance such as air conditioners and washing machines in addition to liners of refrigerators.

Figure 2:
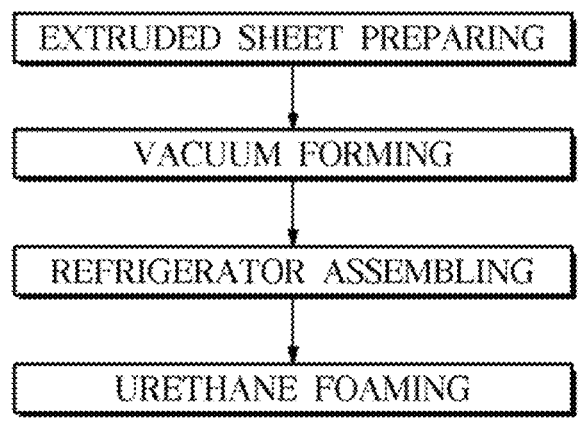
FIG. 2 is a flowchart of a conventional process of manufacturing a refrigerator.
Figure 3:
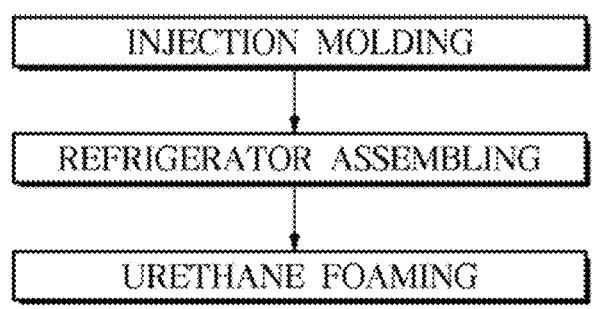
FIG. 3 is a flowchart of a process of manufacturing a refrigerator according to an embodiment of the present disclosure.

FIG. 2 is a flowchart of a conventional process of manufacturing a refrigerator. FIG. 3 is a flowchart of a process of manufacturing a refrigerator according to an embodiment of the present disclosure.

Referring to FIG. 2, conventional liners of refrigerators have been manufactured by extruded sheet-preparing, vacuum forming, refrigerator assembling, and urethane foaming processes. However, the liner of the refrigerator according to an embodiment of the present disclosure is manufactured by injection molding, refrigerator assembling, and urethane foaming processes.

As described above, in the case of manufacturing liners of refrigerators by vacuum forming, there may be problems of excessively increasing manufacturing costs, difficulties in processing of edges and corners, and deteriorating the quality of external appearance.

However, when liners of refrigerators are manufactured by injection molding, costs for equipment and processing may decrease, thereby improving price competitiveness. In addition, in the case of manufacturing the liners of the refrigerators by injection molding, edges and corners may be easily processed and a bumpy surface caused by a foaming process is not formed, thereby improving the quality of external appearance.

In the manufacture of liners of refrigerators by injection molding, high flowability is required. However, flowability generally has a trade-off relationship with chemical resistance and thus it is difficult to satisfy both physical properties at the same time. In the present disclosure, an injection material having high flowability facilitating injection molding and sufficient chemical resistance is provided by optimizing the composition.

The liner formed of the HIPS injection material or the ABS ALLOY injection material in the form of a thin film may have a thickness of 1 to 2.5 mm.

A too thin liner may not have sufficient strength. However, when a too thick liner may narrow the interior space.

Hereinafter, the HIPS injection material according to an embodiment of the present disclosure will be described in more detail.

The HIPS injection material may include 45 to 65 parts by weight of a chemical-resistant HIPS material and 35 to 55 parts by weight of a highly flowable HIPS material based on 100 parts by weight of the HIPS injection material.

A too low amount of the chemical-resistant HIPS material may cause deterioration in chemical resistance. However, an excess of the chemical-resistant HIPS material may cause deterioration in flowability and tensile strength.

In addition, a too low amount of the highly flowable HIPS material may decrease flowability, thereby causing difficulties in injection molding. However, an excess of the highly flowable HIPS material may cause deterioration in chemical resistance and impact strength.

The chemical-resistant HIPS material may include 9.5 to 12 wt % of rubber and the balance of polystyrene (PS), and an average particle diameter of the rubber may be from 6.0 to 8.5 μm. As the average particle diameter of the rubber increases, chemical resistance is improved. Thus, the chemical-resistant HIPS material may have excellent chemical resistance by using rubber with a large average particle diameter.

In addition, the highly flowable HIPS material may include 7.0 to 9.0 wt % of rubber and the balance of polystyrene (PS), and an average particle diameter of the rubber is from 1.2 to 1.8 μm. The highly flowable HIPS material may have high flowability with a melt index (MI) of 15 to 19 g/10 min by adjusting the amount of the rubber.

Both the chemical-resistant HIPS material and the highly flowable HIPS material are rubber-modified polystyrene resins prepared by a conventional bulk polymerization method.

Meanwhile, as used herein, the term "average" refers to an average of measurement values obtained at 5 random points.

By adjusting the amounts of the chemical-resistant HIPS material and the highly flowable HIPS material, the HIPS injection material of the present disclosure may have a melt index (MI) of 6.0 to 9.5 g/10 min.

A too low melt index may cause difficulties in injection molding. However, a too high melt index may cause deterioration in mechanical properties such as tensile strength and impact strength.

The HIPS injection material according to the present disclosure may have a tensile strength of 180 to 300 kgf/cm², an impact strength of 7 to 16 kgf cm/cm, and a flexural modulus of 16000 to 24000 kgf/cm².

A too low tensile strength may cause deformation or occurrence of cracks during an assembling process. However, a too high tensile strength may decrease flowability, thereby deteriorating productivity.

A too low impact strength may cause occurrence of cracks at hook areas for assembling. However, a too high impact strength may decrease flowability like the case of tensile strength, thereby deteriorating productivity.

A too low flexural modulus may cause deformation by a load of a substrate. However, a too high flexural modulus may cause occurrence of cracks at hook areas for assembling.

The HIPS injection material according to the present disclosure may have a heat deflection temperature (HDT) of 75 to 85° C. at a load of 1.82 kg.

A too low heat deflection temperature may cause deformation during an assembling process at a high temperature. However, a too high heat deflection temperature may cause a decrease in flowability, thereby deteriorating productivity.

Hereinafter, the ABS ALLOY injection material according to an embodiment of the present disclosure will be described in more detail.

The ABS ALLOY injection material may include 65 to 85 parts by weight of a styrene-acrylonitrile (SAN) resin, 10 to 20 parts by weight of an acrylonitrile-polybutyl acrylic acid-styrene copolymer resin (g-AAS), 5 to 15 parts by weight of an acrylonitrile-butadiene-styrene copolymer resin (g-ABS), and 3 to 6 parts by weight of ethylene/alkyl (meth)acrylate based on 100 parts by weight of the ABS ALLOY injection material.

A too low amount of the SAN resin may cause deterioration in tensile strength. However, an excess of the SAN resin may cause deterioration in impact strength.

A too low amount of g-AAS may cause deterioration in chemical resistance. However, an excess of g-AAS may cause an increase in manufacturing costs, thereby decreasing price competitiveness.

A too low amount of g-ABS may cause deterioration in impact strength. However, an excess of g-ABS may cause deterioration in flowability.

A too low amount of ethylene/alkyl(meth)acrylate may cause deterioration in chemical resistance in the same manner as the case of g-AAS. However, an excess of ethylene/alkyl(meth)acrylate may cause deterioration in price competitiveness.

The SAN resin may include 25 to 29 wt % of acrylonitrile and the balance of polystyrene (PS) and have a weight average molecular weight of 120,000 to 160,000.

A too low amount of acrylonitrile may cause deterioration in chemical resistance. However, an excess of acrylonitrile may cause deterioration in impact strength.

Meanwhile, the weight average molecular weight, as a generic term indicating a molecular weight of a polymer compound, refers to an average molecular weight obtained by averaging a molecular weight of component molecular species of a polymer compound having a molecular weight distribution by weight fraction.

The g-AAS and g-ABS may include 50 to 60 wt % of a rubber material and the balance of the SAN resin and have a core-shell structure. The g-AAS and g-ABS may be obtained by graft emulsion polymerization of a rubber polymer having a diameter of 0.3 μm. In the g-AAS and g-ABS, the core at the center may be formed of the rubber material and the shell surrounding the surface of the core may be formed of the SAN resin.

The ethylene/alkyl(meth)acrylate may be represented by Formula 1 below.

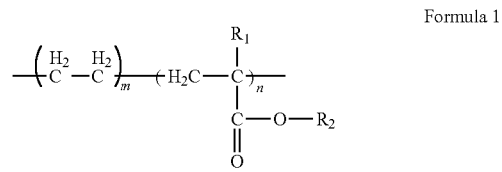

Formula 1

In Formula 1 above, R1 is hydrogen or a methyl group. In Formula 1 above, R2, as a C1-C12 alkyl group, is hydrogen, a methyl group, an ethyl group, a propyl group, an isopropyl group, a butyl group, a sec-butyl group, a t-butyl group, or an isobutyl group. In Formula 1 above, m and n are degrees of polymerization and a ratio of m to n is from 300:1 to 10:90.

The ethylene/alkyl(meth)acrylate may be a mixture of at least one of random, block, multiblock, and graft copolymers.

The ABS ALLOY injection material may have a melt index (MI) of 4.5 to 8.0 g/10 min.

Like the HIPS injection material, a too low melt index of the ABS ALLOY injection material may cause difficulties in injection molding. However, a too high melt index may cause deterioration in mechanical properties such as tensile strength and impact strength.

The ABS ALLOY injection material according to the present disclosure may have a tensile strength of 400 to 520 kgf/cm², an impact strength of 18 to 30 kgf cm/cm, and a flexural modulus of 18000 to 26000 kgf/cm².

A too low tensile strength may cause deformation or occurrence of cracks during an assembling process. However, a too high tensile strength may decrease flowability, thereby deteriorating productivity.

A too low impact strength may cause occurrence of cracks at hook areas for assembling. However, a too high impact strength may decrease flowability as in the case of tensile strength, thereby deteriorating productivity.

A too low flexural modulus may cause deformation by a load of a substrate. However, a too high flexural modulus may cause occurrence of cracks at hook areas for assembling.

The ABS ALLOY injection material according to the present disclosure may have a heat deflection temperature (HDT) of 75 to 90° C. at a load of 1.82 kg.

A too low heat deflection temperature may cause deformation during an assembling process at a high temperature. However, a too high heat deflection temperature may decrease flowability, thereby deteriorating productivity.

Hereinafter, a HIPS injection material for home appliances and an ABS ALLOY injection material for home appliances according to another embodiment of the present disclosure will be described.

The HIPS injection material for home appliances according to an embodiment of the present disclosure, as a HIPS injection material composition for home appliances including a chemical-resistant HIPS material and a highly flowable HIPS material, may include 45 to 65 parts by weight of the chemical-resistant HIPS material and 35 to 55 parts by weight of the highly flowable HIPS material based on 100 parts by weight of the HIPS injection material and may have a melt index (MI) of 6.0 to 9.5 g/10 min.

In addition, the HIPS injection material for home appliances according to an embodiment of the present disclosure may have a tensile strength of 180 to 300 kgf/cm$^2$, an impact strength of 7 to 16 kgf cm/cm, and a flexural modulus of 16000 to 24000 kgf/cm$^2$.

In addition, the HIPS injection material for home appliances according to an embodiment of the present disclosure may have a heat deflection temperature (HDT) of 75 to 85° C. at a load of 1.82 kg.

The ABS ALLOY injection material for home appliances according to an embodiment of the present disclosure, as an ABS ALLOY injection material composition, including a styrene-acrylonitrile (SAN) resin, an acrylonitrile-polybutyl acrylic acid-styrene copolymer resin (g-AAS), an acrylonitrile-butadiene-styrene copolymer resin (g-ABS), and ethylene/alkyl(meth)acrylate, may include 65 to 85 parts by weight of the SAN resin, 10 to 20 parts by weight of g-AAS, 5 to 15 parts by weight of g-ABS, and 3 to 6 parts by weight of ethylene/alkyl(meth)acrylate based on 100 parts by weight of the ABS ALLOY injection material, and may have a tensile strength of 400 to 520 kgf/cm$^2$, an impact strength of 18 to 30 kgf cm/cm, and a flexural modulus of 18000 to 26000 kgf/cm$^2$.

In addition, the ABS ALLOY injection material for home appliances according to an embodiment of the present disclosure may have a heat deflection temperature (HDT) of 75 to 90° C. at a load of 1.82 kg.

In addition, the ABS ALLOY injection material for home appliances according to an embodiment of the present disclosure may have a melt index (MI) of 4.5 to 8.0 g/10 min.

The ABS ALLOY injection material and the HIPS injection material may be applied to all types of home appliances that require sufficient strength and chemical resistance such as air conditioners and washing machines.

Hereinafter, the present disclosure will be described in more detail with reference to the following examples and comparative examples. However, the following examples are merely presented to exemplify the contents and effects of the present disclosure, and the scope and effects of the present disclosure are not limited thereto.

EXAMPLES

A small amount of an antioxidant was added to various HIPS injection material compositions shown in Table 1 below, and the compositions were processed into pellets at 220° C. After drying the prepared pellets at 75° C. for 2 hours, the pellets were injection-molded by using a small injection molding device at a forming temperature of 230° C. and a mold temperature of 60° C. to prepare samples.

TABLE 1

| Example | HIPS injection material | Chemical-resistant HIPS material | Highly flowable HIPS material | Common HIPS material |
|---|---|---|---|---|
| Example 1 | 100 | 50 | 50 | — |
| Example 2 | 100 | 60 | 40 | — |
| Comparative Example 1 | 100 | 40 | 60 | — |
| Comparative Example 2 | 100 | 70 | 30 | — |
| Comparative Example 3 | 100 | 10 | — | 90 |
| Comparative Example 4 | 100 | — | — | 100 |

Table 2 below shows melt index, tensile strength, impact strength, flexural modulus, heat deflection temperature, environmental stress cracking (ESC) evaluation result, and temperature cycle evaluation result.

The melt index (MI) was measured according to the ASTM D1238 standards at 200° C. with a load of 5 kg.

The tensile strength of each sample having a thickness of 3.2 mm was measured according to the ASTM D638 standards at room temperature under a tensile speed of 50 mm/min.

The impact strength of each sample having a thickness of 3.2 mm was measured according to the ASTM D256 standards at room temperature.

The flexural modulus of each sample having a thickness of 6.4 mm was measured according to the ASTM D790 standards at room temperature at a testing speed of 5 mm/min.

The heat deflection temperature (HDT) was measured according to the ASTM D648 standards with a load of 1.82 kg.

The environmental stress cracking evaluation result was obtained using a bent strip tester following the ISO-4599 standards by visually observing whether cracks occurred 24 hours after placing the samples on a jig with a strain of 1%, attaching a gauze thereto, and applying soybean oil thereto.

In the environmental stress cracking evaluation result of Table 2, 'O' indicates that cracks occurred and 'X' indicates that cracks did not occur. In the case where cracks did not occur, it was evaluated that chemical resistance was excellent.

The temperature cycle evaluation result was obtained by visually observing whether cracks occurred after 5 cycles, each cycle performed by placing a final product of the refrigerator in a chamber and storing the refrigerator in the chamber in a temperature range of −30 to 70° C. for 17 hours.

In the temperature cycle evaluation result shown in Table 2, the 'O' indicates that cracks occurred, and 'X' indicates that cracks did not occur. In the case where cracks did not occur, it was evaluated that physical properties sufficient for the liner of the refrigerator were obtained.

TABLE 2

| Example | Melt index (g/10 min) | Tensile strength (kgf/cm$^2$) | Impact strength (kgf · cm/cm) | Flexural modulus (kgf/cm$^2$) | Heat deflection temperature (° C.) | Environmental stress cracking evaluation result | Temperature cycle evaluation result |
|---|---|---|---|---|---|---|---|
| Example 1 | 9.5 | 225 | 10 | 19500 | 75 | X | X |
| Example 2 | 7.5 | 235 | 10 | 20500 | 77 | X | X |
| Comparative Example 1 | 11.6 | 245 | 9 | 22000 | 78 | ○ | ○ |
| Comparative Example 2 | 5.5 | 220 | 11 | 18500 | 74 | X | X |
| Comparative Example 3 | 5.1 | 250 | 11 | 21500 | 80 | ○ | ○ |
| Comparative Example 4 | 5.5 | 265 | 12 | 22500 | 81 | ○ | ○ |

Referring to Table 2, Examples 1 and 2 satisfied all ranges of components suggested in the present disclosure. Therefore, Examples 1 and 2 satisfied all ranges of the melt index of 6.0 to 9.5 g/10 min, the tensile strength of 180 to 300 kgf/cm$^2$, the impact strength of 7 to 16 kgf cm/cm, the flexural modulus of 16000 to 24000 kgf/cm$^2$, and the heat deflection temperature of 72 to 85° C. In addition, no cracks were observed in Examples 1 and 2 in the environmental stress cracking evaluation result and the temperature cycle evaluation result. That is, Examples 1 and 2 satisfied both high flowability and excellent chemical resistance at the same time while having sufficient physical properties for the liner of the refrigerator.

However, in Comparative Example 1, cracks occurred in the environmental stress cracking evaluation result and in the temperature cycle evaluation result due to the low amount of the chemical-resistant HIPS material. That is, the sample of Comparative Example 1 had inferior chemical resistance and could not be evaluated as having sufficient physical properties for the liner of the refrigerator.

Comparative Example 2 could not satisfy the melt index of 6.0 to 9.5 g/10 min due to a low amount of the highly flowable HIPS material. That is, the sample of Comparative Example 2 could not obtain sufficient flowability for injection molding.

Comparative Examples 3 and 4 did not satisfy the amounts of the chemical-resistant HIPS material and the highly flowable HIPS material. Therefore, in Comparative Examples 3 and 4, cracks occurred in environmental stress cracking evaluation result, and the melt index of 6.0 to 9.5 g/10 min could not be satisfied. In addition, in Comparative Examples 3 and 4, cracks occurred in the temperature cycle evaluation result. That is, chemical resistance deteriorated, flowability sufficient for injection molding could not be obtained, and thus the samples of Comparative Examples 3 and 4 could not be evaluated as having sufficient physical properties for the liner of the refrigerator.

A small amount of an antioxidant was added to various ABS ALLOY injection material compositions shown in Table 3 below, and the compositions were processed into pellets at 220° C. After drying the prepared pellets at 80° C. for 2 hours, the pellets were injection-molded by using a small injection molding device at a forming temperature of 240° C. and a mold temperature of 60° C.

In Table 3 below, the SAN1 is an SAN in which the amount of acrylonitrile is 20 wt %, and SAN2 is an SAN in which the amount of acrylonitrile is 27 wt %.

TABLE 3

| | ABS ALLOY injection material composition (parts by weight) | | | | | |
|---|---|---|---|---|---|---|
| Example | ABS ALLOY injection material | SAN1 | SAN2 | g-AAS | g-ABS | Ethylene/ alkyl(meth)acrylate |
| Example 3 | 100 | 75 | — | 12 | 10 | 3 |
| Example 4 | 100 | 77 | — | 10 | 10 | 3 |
| Comparative Example 5 | 100 | 75 | — | — | 25 | — |
| Comparative Example 6 | 100 | 75 | — | 8 | 17 | — |
| Comparative Example 7 | 100 | 74 | — | 23 | — | 3 |
| Comparative Example 8 | 100 | — | 75 | 15 | 10 | — |

Table 4 below shows melt index, tensile strength, impact strength, flexural modulus, heat deflection temperature, environmental stress cracking (ESC) evaluation result, and temperature cycle evaluation result.

Methods for measuring the melt index, tensile strength, impact strength, flexural modulus, heat deflection temperature, environmental stress cracking evaluation and temperature cycle evaluation of the ABS ALLOY injection material samples are the same as those for the HIPS injection material samples.

TABLE 4

| Example | Melt index (g/10 min) | Tensile strength (kgf/cm²) | Impact strength (kgf · cm/cm) | Flexural modulus (kgf/cm²) | Heat deflection temperature (° C.) | Environmental stress cracking evaluation result | Temperature cycle evaluation result |
|---|---|---|---|---|---|---|---|
| Example 3 | 5.6 | 450 | 24 | 22500 | 82 | X | X |
| Example 4 | 6.0 | 460 | 25 | 23000 | 83 | X | X |
| Comparative Example 5 | 5.7 | 440 | 27 | 22000 | 82 | ○ | ○ |
| Comparative Example 6 | 5.6 | 460 | 25 | 23000 | 83 | ○ | ○ |
| Comparative Example 7 | 4.5 | 470 | 17 | 24000 | 84 | X | X |
| Comparative Example 8 | 5.6 | 450 | 24 | 22500 | 82 | ○ | ○ |

Referring to Table 4, Examples 3 and 4 satisfied all ranges of the components suggested in the present disclosure. Therefore, Examples 3 and 4 satisfied all of the melt index of 4.5 to 8.0 g/10 min, the tensile strength of 400 to 520 kgf/cm², the impact strength of 18 to 30 kgf cm/cm, the flexural modulus of 18000 to 26000 kgf/cm², and the heat deflection temperature of 75 to 90° C. In addition, no cracks were observed in Examples 3 and 4 in the environmental stress cracking evaluation result and the temperature cycle evaluation result. That is, Examples 3 and 4 satisfied both high flowability and excellent chemical resistance while having sufficient physical properties for the liner of the refrigerator.

However, in Comparative Example 5, cracks occurred in the environmental stress cracking evaluation result and in the temperature cycle evaluation result because g-AAS was not added thereto. That is, the sample of Comparative Example 5 had inferior chemical resistance.

In Comparative Example 6, the amount of g-AAS was less than 10 parts by weight. Therefore, in Comparative Example 6, cracks occurred in the environmental stress cracking evaluation result and in the temperature cycle evaluation result. That is, the sample of Comparative Example 6 had inferior chemical resistance.

Because g-ABS was not added to the sample of Comparative Example 7, the impact strength of 18 to 30 kgf cm/cm was not satisfied. That is, although the sample of Comparative Example 7 was an ABS ALLOY injection material, sufficient strength was not obtained.

In Comparative Example 8, because a SAN having a low content of acrylonitrile was used, cracks occurred in the environmental stress cracking evaluation result and cracks occurred in the temperature cycle evaluation result. That is, the sample of Comparative Example 8 had inferior chemical resistance.

Figure 4:
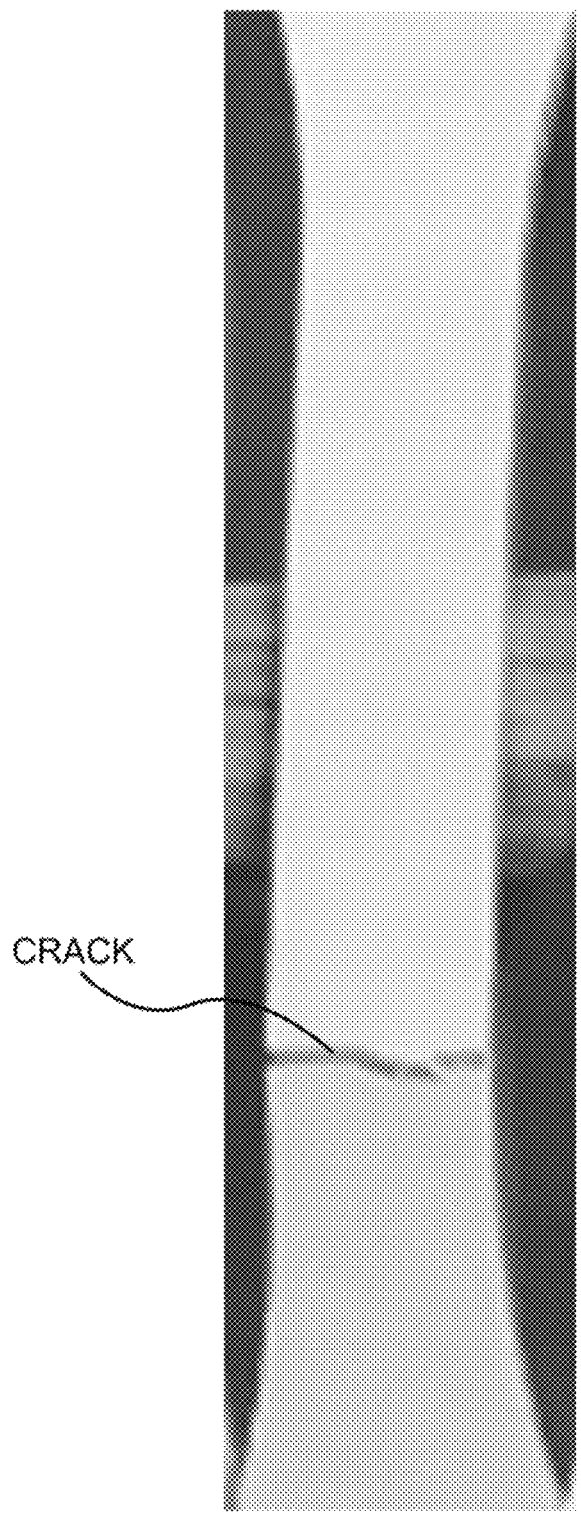
FIG. 4 is a photograph showing an environmental stress cracking (ESC) evaluation result of Comparative Example 6 according to an embodiment of the present disclosure.
Figure 5:
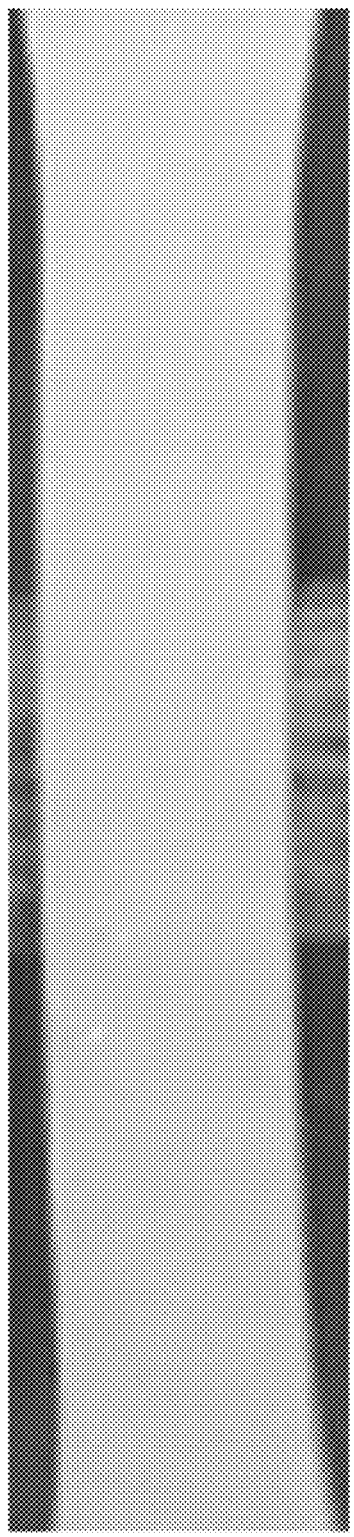
FIG. 5 is a photograph showing an ESC evaluation result of Example 4 according to an embodiment of the present disclosure.

FIG. 4 is a photograph showing an environmental stress cracking (ESC) evaluation result of Comparative Example 6, and FIG. 5 is a photograph showing an ESC evaluation result of Example 4.

Referring to FIGS. 4 and 5, cracks occurred in Comparative Example 6 and no cracks occurred in Example 4 in the environmental stress cracking evaluation result. That is, it was confirmed that cracks may occur by a vegetable oil in the case where chemical resistance is inferior.

The embodiments of the present disclosure have been shown and described above with reference to the accompanying drawings. It will be understood by those of ordinary skill in the art that the present disclosure may be easily modified into other detailed forms without changing the technical principle or essential features of the present disclosure. However, the disclosed embodiments are illustrative and the scope of the present disclosure is not limited thereby.

What is claimed is:

1. A refrigerator comprising:
   a cabinet frame defining an external appearance of the refrigerator;
   a liner separating an inside of the refrigerator from an insulation material while the insulation material is between the cabinet frame and the liner,
   wherein the liner includes:
      a high impact polystyrene (HIPS) injection material that, based on 100 parts by weight of the HIPS injection material, includes 45 to 65 parts by weight of a chemical-resistant HIPS material and 35 to 55 parts by weight of a highly flowable HIPS material.

2. The refrigerator according to claim 1, wherein
   the liner includes a top side, a right side, a left side, a back side, and a bottom side,
   the top side, the right side, the left side, and the back side of the liner include the HIPS injection material, and
   the bottom side of the liner includes an acrylonitrile butadiene styrene (ABS) ALLOY injection material.

3. The refrigerator according to claim 1, wherein the liner has a thickness of 1 to 2.5 mm.

4. The refrigerator according to claim 1, wherein
   the chemical-resistant HIPS material includes 9.5 to 12 wt % of a rubber, and a balance of polystyrene (PS), and an average particle diameter of the rubber is from 6.0 to 8.5 μm.

5. The refrigerator according to claim 4, wherein
   the highly flowable HIPS material includes 7.0 to 9.0 wt % of a rubber, and a balance of polystyrene (PS), and an average particle diameter of the rubber is from 1.2 to 1.8 μm.

6. The refrigerator according to claim 1, wherein
   the highly flowable HIPS material includes 7.0 to 9.0 wt % of a rubber, and a balance of polystyrene (PS), and an average particle diameter of the rubber is from 1.2 to 1.8 μm.

7. The refrigerator according to claim 1, wherein the HIPS injection material has a melt index (MI) of 6.0 to 9.5 g/10 min.

8. The refrigerator according to claim 1, wherein the liner further includes:
   an acrylonitrile butadiene styrene (ABS) ALLOY injection material that, based on 100 parts by weight of the ABS ALLOY injection material, includes:

65 to 85 parts by weight of a styrene-acrylonitrile (SAN) resin, 10 to 20 parts by weight of an acrylonitrile-polybutyl acrylic acid-styrene copolymer resin (g-AAS), 5 to 15 parts by weight of an acrylonitrile-butadiene-styrene copolymer resin (g-ABS), and 3 to 6 parts by weight of ethylene/alkyl(meth)acrylate.

9. The refrigerator according to claim 8, wherein the SAN resin includes 25 to 29 wt % of acrylonitrile, and a balance of polystyrene (PS), and has a weight average molecular weight of 120,000 to 160,000.

10. The refrigerator according to claim 8, wherein the g-AAS and g-ABS have a core-shell structure and include 50 to 60 wt % of a rubber material and a balance of the SAN resin.

11. The refrigerator according to claim 8, wherein the ethylene/alkyl(meth)acrylate is represented by a formula as follows:

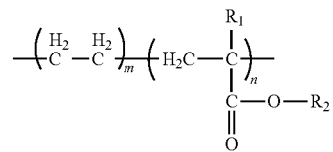

wherein R1 is hydrogen or a methyl group,

R2 is a C1-C12 alkyl group, hydrogen, a methyl group, an ethyl group, a propyl group, an isopropyl group, a butyl group, a sec-butyl group, a t-butyl group, or an isobutyl group, m and n are degrees of polymerization, and a ratio of m to n is from 300:1 to 10:90.

12. The refrigerator according to claim 1, wherein the liner further includes an acrylonitrile butadiene styrene (ABS) ALLOY injection material having a melt index (MI) of 4.5 to 8.0 g/10 min.

* * * * *